US009576474B2

United States Patent
Macdonald et al.

(10) Patent No.: US 9,576,474 B2
(45) Date of Patent: Feb. 21, 2017

(54) PROVIDING CELLULAR DATA TO A VEHICLE OVER DIFFERENT DATA CHANNELS

(71) Applicant: General Motors LLC, Detroit, MI (US)

(72) Inventors: Andrew J Macdonald, Grosse Pointe Park, MI (US); Jonathan L Gerlach, Canton, MI (US); Dipankar Pal, Sylvania, OH (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 369 days.

(21) Appl. No.: 14/172,200

(22) Filed: Feb. 4, 2014

(65) Prior Publication Data

US 2015/0223273 A1 Aug. 6, 2015

(51) Int. Cl.
| | | |
|---|---|---|
| *H04L 1/00* | (2006.01) | |
| *G08C 17/02* | (2006.01) | |
| *H04L 29/08* | (2006.01) | |
| *H04W 4/04* | (2009.01) | |
| *H04W 4/06* | (2009.01) | |
| *H04L 12/24* | (2006.01) | |
| *H04L 29/06* | (2006.01) | |
| *H04W 76/02* | (2009.01) | |
| *H04L 29/12* | (2006.01) | |

(52) U.S. Cl.
CPC ............. *G08C 17/02* (2013.01); *H04L 67/12* (2013.01); *H04W 4/046* (2013.01); *H04W 4/06* (2013.01); *G08C 2201/42* (2013.01); *H04L 41/5003* (2013.01); *H04L 61/6022* (2013.01); *H04L 63/102* (2013.01); *H04L 65/80* (2013.01); *H04L 67/28* (2013.01); *H04W 76/02* (2013.01); *H04W 76/021* (2013.01)

(58) Field of Classification Search
CPC ... G08C 17/02; G08C 2201/42; H04W 4/046; H04W 4/06; H04W 76/02; H04W 76/021; H04L 61/6022; H04L 67/12; H04L 67/28; H04L 63/102; H04L 41/5003; H04L 65/80

See application file for complete search history.

(56) References Cited

U.S. PATENT DOCUMENTS

| | | | |
|---|---|---|---|
| 9,370,029 B2 * | 6/2016 | O'Meara | H04L 63/0281 |
| 2010/0274690 A1 * | 10/2010 | Tate, Jr. | B60L 11/1824 705/30 |
| 2012/0008786 A1 * | 1/2012 | Cronk | H04L 63/102 380/282 |

(Continued)

*Primary Examiner* — Jutai Kao
(74) *Attorney, Agent, or Firm* — Christopher DeVries; Reising Ethington P.C.

(57) ABSTRACT

A method and a system for providing vehicle services to at least one communication device located at a vehicle via a vehicle telematics unit. The method carried out by the system includes the steps of: receiving a request at the vehicle telematics unit for first vehicle services from a first communication device located at a vehicle; associating a first identifier with the first communication device; and providing the first vehicle services to the first communication device, wherein the vehicle services are provided according to at least one services parameter associated with the first identifier.

16 Claims, 2 Drawing Sheets

(56) References Cited

U.S. PATENT DOCUMENTS

| | | | | |
|---|---|---|---|---|
| 2014/0096217 A1* | 4/2014 | Lehmann | ................ | H04L 63/08 |
| | | | | 726/7 |
| 2014/0294180 A1* | 10/2014 | Link, II | ................. | G08G 1/205 |
| | | | | 380/270 |
| 2014/0309863 A1* | 10/2014 | Ricci | ........................ | B60Q 1/00 |
| | | | | 701/36 |

* cited by examiner

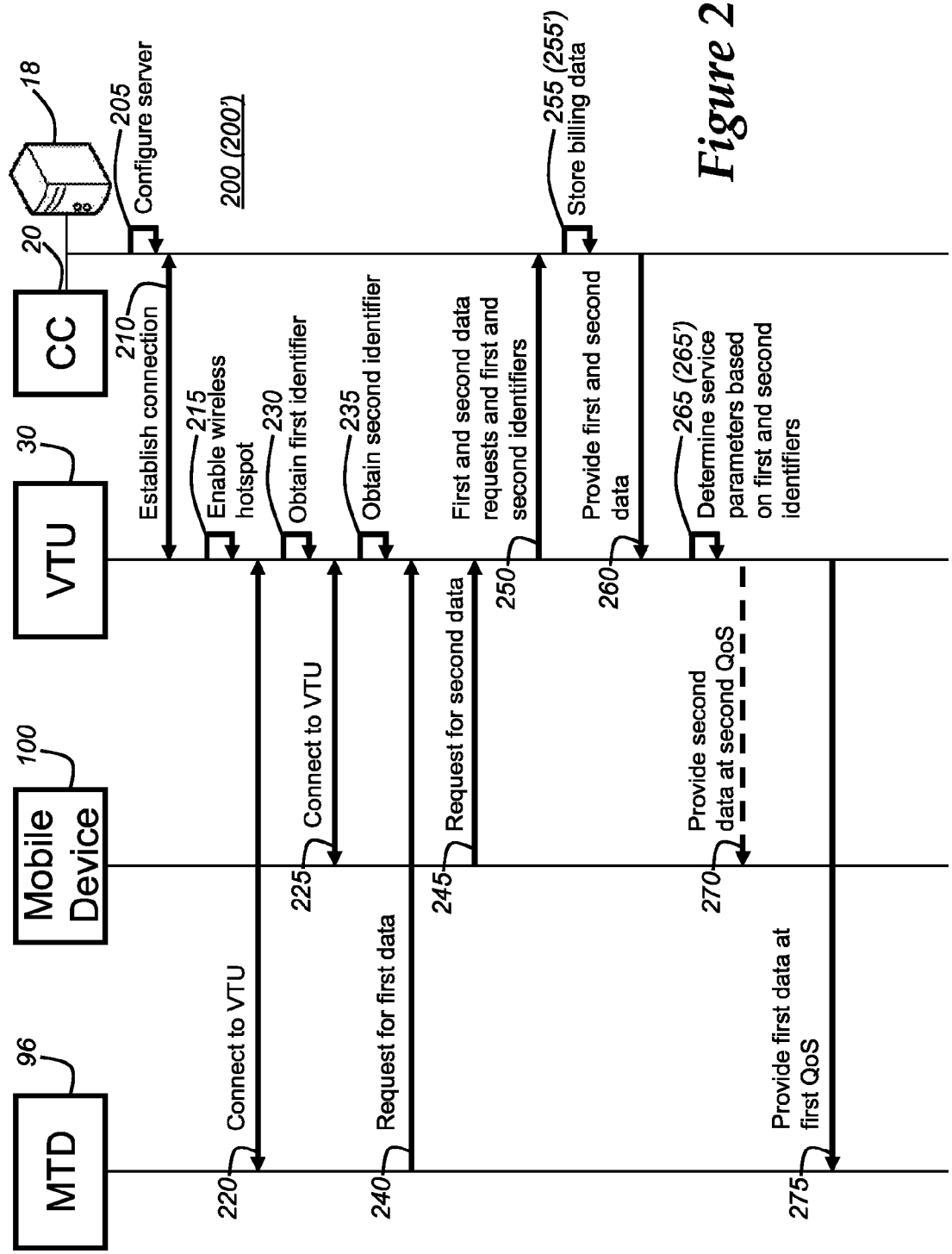

PROVIDING CELLULAR DATA TO A VEHICLE OVER DIFFERENT DATA CHANNELS

TECHNICAL FIELD

The present invention relates to providing wireless data services to a vehicle, and more particularly, to providing the wireless data services to communication devices located at the vehicle via a telematics unit.

BACKGROUND

Vehicle occupants are increasingly desiring greater access to entertainment data and applications while in their vehicles. Vehicles are capable of storing some of this data or applications within the system storage. At other times, it may be desirable to acquire this entertainment data from a remote services or from the cloud.

Occasionally, different data may be desired for different applications simultaneously. For example, satellite Radio may be streaming while a GPS or navigational data download also is desired. At times, the amount of simultaneously desired data that requires a quality of service to be maintained to drive all the applications' needs.

SUMMARY

According to an embodiment of the invention, there is provided a method of providing vehicle services to at least one communication device located at a vehicle via a vehicle telematics unit. The method includes the steps of: (a) receiving a request at the vehicle telematics unit for first vehicle services from a first communication device located at a vehicle; (b) associating a first identifier with the first communication device; and (c) providing the first vehicle services to the first communication device, wherein the vehicle services are provided according to at least one services parameter associated with the first identifier.

According to another embodiment of the invention, there is provided a method of providing vehicle services to at least one communication device located at a vehicle via a vehicle telematics unit. The method includes: (a) receiving at the vehicle telematics unit one or more requests from each of one or more communication devices, wherein each of the received requests are for vehicle services: (b) receiving a unique identifier from each of the communication devices; (c) based on the received unique identifier, prioritizing vehicle services to each of the requesting communication devices; and (d) providing vehicle services to at least one of the communication devices according to the prioritization.

According to another embodiment of the invention, there is provided a computer program product. The computer program product includes a non-transitory computer readable medium for a call center computer or a vehicle telematics unit for selectively determining one or more data channels for transmitting vehicle data services, configured to perform the following steps: (a) receiving a first identifier associated with a vehicle communication device and a second identifier associated with a mobile communication device; (b) receiving a first data services request from the vehicle communication device and a second data services request from the mobile communications device; (c) based on the first and second identifiers and the first and second requests, determining a first data channel for the first data services and a second data channel for the second data services, wherein the first data channel has a higher quality of service (QoS) than the second data channel; and (d) storing billing parameters associated with both the first and second data services.

BRIEF DESCRIPTION OF THE DRAWINGS

One or more embodiments of the invention will hereinafter be described in conjunction with the appended drawings, wherein like designations denote like elements, and wherein:

FIG. 2 is a flow diagram illustrating two exemplary methods utilizing the communications system shown in FIG. 1.

DETAILED DESCRIPTION OF THE ILLUSTRATED EMBODIMENT(S)

Figure 1:
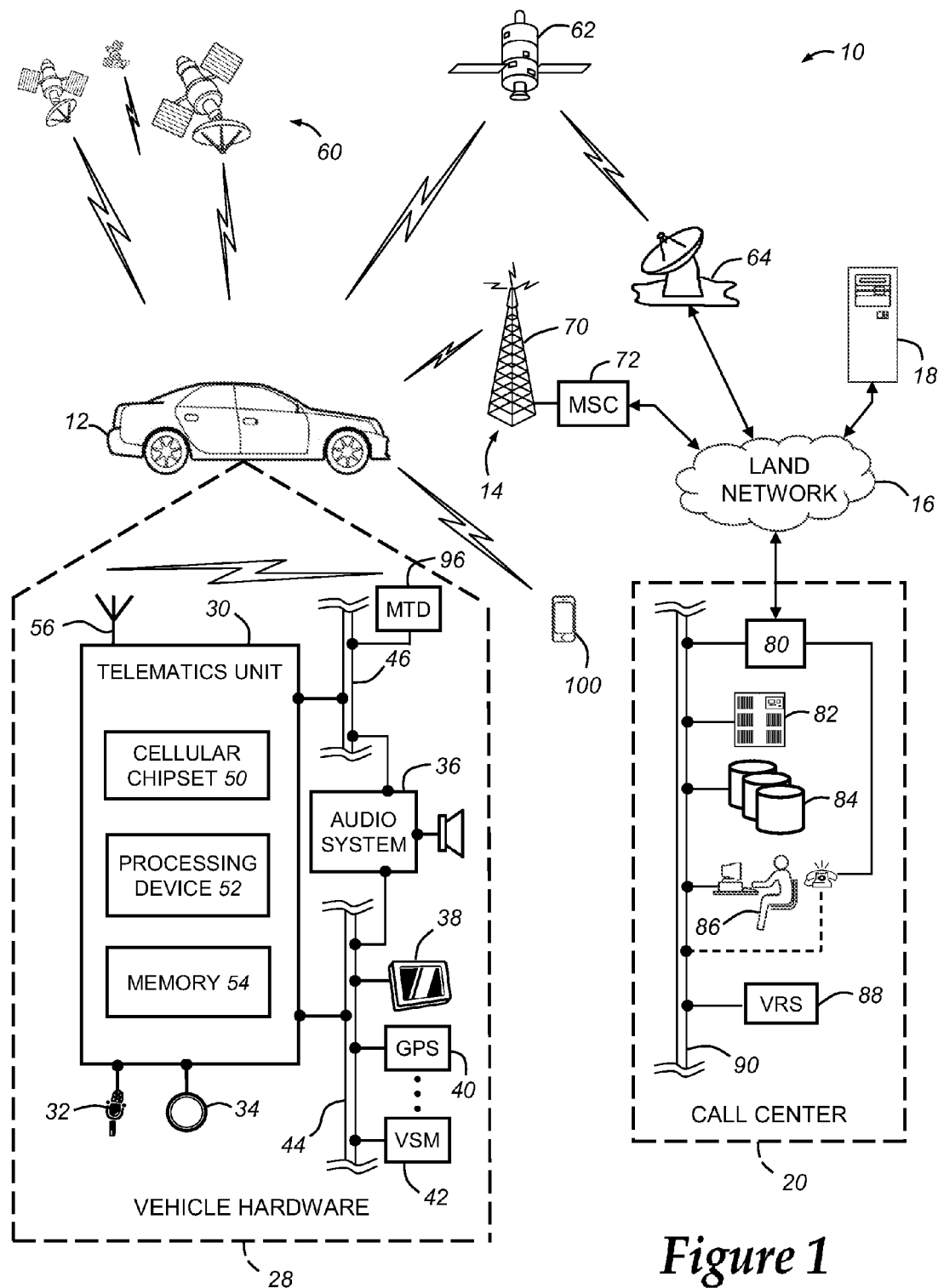
FIG. 1 is a block diagram depicting an embodiment of a communications system that is capable of utilizing the method disclosed herein.

The system described below includes a vehicle having a telematics unit and one or more communication devices in or within the vicinity of the vehicle. The communication devices may be mobile devices or integrated modules within the vehicle. The telematics unit is capable of acquiring data from a cloud server or a call center and then providing or conveying this data to the communication devices, rather than the communication devices receiving this data directly therefrom. In some implementations, the data is provided wirelessly to the communication devices from the telematics unit, It is desirable in some instances to categorize the data being provided by various communication devices. This may be accomplished by receiving and using a unique identifier from each communication device. This may enable the telematics unit to prioritize which communication device should continue to receive data if the through-put or wireless bandwidth is limited. For example, it may be desirable to grant a high priority to a communication device such as an integrated vehicle head unit. Thus, when bandwidth is limited, data to other communication devices in the vehicle is either terminated (at least temporarily) or the quality of service (QoS) is degraded but data to the head unit remains the highest available QoS. Also, the data category or type received by certain communication devices may be associated with a predetermined QoS. For example, the head unit may receive the highest QoS, while the QoS for other devices may be lower. The data category may be used for billing purposes as well. For example, the vehicle head unit may be billable at one rate and a communication device such as a Smart phone may be billable at another rate.

This system and the various methods carried out by the system are described below in greater detail. In addition, the operating environment is described below.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 100) can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

In one implementation, the telematics unit 30 may be configured to be a wireless hotspot; i.e., the telematics unit 30 may provide a wireless local area network (WLAN) allowing communication devices with access or permission connectivity to the internet, the call center 20, or remote servers or computers 18. The hardware and software configurations needed to enable the telematics unit 30 with hotspot capability are known to skilled artisans.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and may be stored for current or later playback or may be available for streaming from the call center 20 or a remote computer server 18 (with or without the infotainment module). The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-byturn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off the windshield, and can be used to provide a multitude of input and output functions. Various other vehicle user interfaces can also be utilized, as the interfaces of FIG. 1 are only an example of one particular implementation.

The vehicle electronics 28 may also include a communication device such as a multi-tainment device (MTD) or a human machine interface (HMI) device 96 which may include some of the vehicle electronics previously discussed (e.g., the audio system 36, the visual display 38, etc.). As used herein, the multi-tainment device 96 may include all suitable electronics, software, etc. for providing vehicle entertainment and vehicle infotainment services to the vehicle users and/or occupants. In some instances, the multi-tainment device 96 is electronically coupled to (and in communication with) the telematics unit 30 (e.g., via bus 46). The device 96 may be modular or may be embedded within the vehicle 12. In addition, the multi-tainment device 96 may be integrated (e.g., a fixture) within the vehicle or in some circumstances may be detachably fixed or detachably tethered. Where the device 96 is detachable, the device may be operable both inside and outside of the vehicle. Furthermore, the device 96 may have an antenna coupled to a SRWC module therein (e.g., a Bluetooth or Wi-Fi Direct module). Examples of multi-tainment devices include interactive displays in the vehicle dashboard, interactive displays embedded within the backing of vehicle seating or the vehicle headliner, and other interactive vehicle devices/displays that are portable.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

In at least one implementation, the computer 18 may include a cloud server which may be capable of storing, accessing, and/or sharing electronic data stored therein. Electronic data may include a variety of data files or computers program instructions, for example, among other things, data files, data programs, software, and/or executable applications. The data files may be related to information, entertainment, or any other suitable data. In some instances, the applications may be operative from the server rather than being required to be installed on an individual computer or within the vehicle 12—e.g., within the telematics unit 30 or within the multi-tainment device 96. Skilled artisans will appreciate the multiplicity of ways to utilize server computing (e.g., but not limited to: database servers, file servers, mail servers, print servers, web servers, gaming servers, etc.).

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include communication devices other than the multi-tainment device 96, such as one or more mobile devices 100. In some instances, the mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications, short-range wireless communication (e.g., Wi-Fi Direct and Bluetooth), and communication by wire or tether, as well as other mobile device applications. Such mobile device applications may include software applications, which may be preinstalled or installed by the user (or manufacturer) (e.g., using a graphical user interface or GUI). The hardware of the mobile device 100 may comprise: a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 100 include a cellular telephone, a personal digital assistant (PDA), a Smart Phone, a personal laptop computer having two-way communication capabilities, a netbook computer, a tablet computer, or combinations thereof. The mobile device 100 may be used inside or outside of a mobile vehicle (such as the vehicle 12 shown in FIG. 1), and may be configured to provide services according to a subscription agreement with a third-party facility or wireless/telephone service provider. In other instances, the mobile device 100 may or may not have cellular capability and may be capable of SRWC. And in still other instances, the mobile device 100 may have two-way communication capability by wire. It should be appreciated that various service providers may utilize the wireless carrier system and that the service provider of the telematics unit 30 may not necessarily be the same as the service provider of the mobile device 100 (where applicable).

The mobile device 100 and the vehicle 12 may be used together by a person known as the vehicle user such as the driver. However, the vehicle user does not need to be the driver of the vehicle 12 nor does the vehicle user need to have ownership of the mobile device 100 or the vehicle 12 (e.g., the vehicle user may be an owner or a licensee of either or both).

Method—

The above-described operating environment may be used to carry out the various methods described below. The illustrated methods are merely exemplary.

According to a first embodiment (method 200 shown in FIG. 2), one or more service parameters may be configured at the call center 20 or cloud server 18 for use with one or more communication devices in the vehicle 12 (step 205). Service parameters include quality of service (QoS) parameters, billing parameters, etc. As will be appreciated by skilled artisans, QoS parameters include connection requirements such as service response time, loss, signal-to-noise (SNR) ratio, cross-talk, echo, interrupts, frequency response, loudness levels, etc. QoS may also include grade of service (GoS) requirements, as understood by skilled artisans. QoS may be used to provide different priority to different communication devices located at the vehicle 12 or to provide a predetermined level of performance to a data flow. Performance characteristics may include bit rate, delay, jitter, packet dropping probability, and/or bit error rate. In some applications, assurance of a predetermined level of performance is desirable, especially for real-time streaming multimedia applications such as voice over internet protocol (VoIP), online gaming, streaming radio and/or video, etc. as these examples often require fixed bit rate and are delay sensitive, especially when communicated over the wireless carrier system 14, where through-put or bandwidth may be limited.

The billing parameters may include any parameter associated with charges for providing data to the various communication devices located at the vehicle 12. These parameters may include customer information, communication device identifiers and other suitable communication device information, and different billing rates and data usage for the various communication devices. It may also include predetermined monthly caps for a particular device; e.g., a data usage limit which, when reached, terminates service to a particular communication device. These billing parameters are merely exemplary; other such parameters will be apparent to skilled artisans.

Once the service parameters are configured (step 205), the telematics unit 30 may establish a wireless connection with the call center 20 and/or server 18 (step 210); e.g., a cellular connection.

In addition, the telematics unit 30 may enable its hotspot or WLAN capability (step 215) to connect to one or more communication devices. In this example, one mobile device 100 and the multi-tainment device (MTD) 96 connects to the telematics unit 30 via the hotspot (steps 220, 225). Although it should be appreciated that the devices 96, 100 may couple to the telematics unit in other ways, e.g., via SRWC, by wire, etc.

At the time of connection, the telematics unit 30 may acquire a unique device identifier from each of the communication devices (steps 230, 235). The identifier may be any number, letter, special character, or combination thereof (such as an alpha-numeric sequence) and may include the device's name and various technical information that would uniquely identify the device. In one implementation, the identifier is a media access control address (or MAC Address). Acquiring this identifier may also occur later as well, e.g., when the communication device requests a vehicle service or prior to the vehicle service being ultimately provided to the communication device by the telematics unit.

Following connection to the WLAN, the communication devices may request vehicle services data (steps 240, 245), e.g., first vehicle services data and second vehicle services data, respectively. For example, the MTD 96 may request streaming music (e.g., via a Pandora™), and the mobile device 100 may request to engage in an online game (e.g., Clash of Clans™). In some embodiments, steps 220 and 240 may occur at or near the same time. Similarly, in some embodiments, steps 225 and 245 may occur at or near the same time.

The requests may be received first by the telematics unit 30, and the telematics unit may communicate those vehicle service requests and the identifiers of the devices 96, 100 to the call center 20 (step 250). This may occur as a single wireless transmission or may occur as separate wireless transmissions.

The requests may be received and processed by the call center 20 (step 255). The processing step may include associating or correlating the identifier of each device 96, 100 to one or more billing parameters (e.g., a billing rate). For example, the call center may determine that the MTD identifier should be correlated to a first (e.g., a preferred) billing rate, and the mobile device identifier should be correlated to another billing rate. The processing of step 255 may further include associating various QoS parameters with each communication device 96, 100. For example, the streaming music request by the multi-tainment device 96 may be granted higher priority and a higher level of performance than the online gaming request by the mobile device 100—this also may be based on the identifier. In some implementations, the identifiers may be used in combination with other situational or circumstantial criteria to determine what billing and QoS parameters are appropriate.

The processing step 255 may further include determining an appropriate data channel to communicate the requested vehicle services data to the telematics unit 30. As will be apparent to those skilled in the art, wireless networks (e.g., GSM, CDMA, etc.) may operate using multiple data channels or tunnels. For example, in GSM networks, TDMA uses eight time slots which may be further segregated into logical channels—e.g., signaling channels (BCH, CCH, SDCCH, ACCH, etc.) and traffic channels (TCH). These logical channels may be used for different categories or types of data to be transmitted on assigned or predetermined frames in an assigned or predetermined time slot. Thus, in at least one implementation, the call center 20 may associate the identifier of the MTD 96 with a first TCH and the identifier of the mobile device 100 with a second TCH.

In another example, the appropriate data channel may be associated with a packet data network (or PDN). Skilled artisans will appreciate that wireless service providers utilize multiple PDNs. Thus, the processing step 255 may include determining (e.g., at the call center 20) which data channels of the PDN to use in providing the vehicle services data to the communication devices 96, 100. For example, vehicle services data provided to the MTD 96 may be sent via PDN1, and vehicle services data provided to the mobile device 100 may be sent via PDN2.

And in at least one implementation, the call center 20 may determine the most suitable data channels for transmission based on a predetermined prioritization algorithm. The algorithm may accept as input a number of factors, including the unique device identifier from each of the communication devices, the requested vehicle services data, the particular telematics unit 30 in the vehicle 12 (model number, chipset, etc.) and its capability, the current cellular network conditions, including volume of traffic, etc., just to name a few considerations. The algorithm may perform calculation(s) to determine a suitable output—e.g., which vehicle services data should be sent over which data channel, to the particular vehicle 12. It will be appreciated that this algorithm may support multiple vehicles sequentially, concurrently, or both sequentially and concurrently.

Thus in step 260, according the exemplary requests above, the streaming music may be sent over the first TCH while the online gaming data may be sent over the second TCH. In at least one implementation, any vehicle data services sent from the call center 20 or cloud server 18 that is ultimately to be provided to the MTD 96 is transmitted over a dedicated data channel—e.g., PDN1 may be the dedicated data channel.

At step 265, the telematics unit 30 may receive the data over the first and second TCH and determine which data is to be delivered to the MTD 96 and which data is to be delivered to the mobile device 100. This may be determined, at least in part, on an association using the two unique identifiers.

And at steps 270, 275, the data is provided to each communication device 96, 100 via the hotspot; i.e., the streaming music is provided to the MTD and the mobile device receives connectivity for online gaming.

Of course, additional steps to method 200 also are possible. For example, method 200 may include presenting a bill or request for payment to the vehicle user based on data usage associated with the first PDN, and presenting a bill or request for payment to the mobile device user based on data usage associated with the second PDN. In some instances, the bill may reflect that vehicle services data was provided at a higher priority or higher QoS.

According to a second embodiment (also shown in FIG. 2), a method 200' has like numbers designating like steps or parts associated with method 200. However, in method 200', step 255 is replaced by step 255' and step 265 is replaced by step 265'.

At step 255', the call center 20 receives the request(s) sent at step 250 and performs processing associated with the billing parameters. The call center still provides the data over different data channels still at 260. However, upon receipt of the data at step 265', the telematics unit 30 determines the QoS parameters (including priority) and then accordingly provides the data to the communication devices 100, 96 at steps 270, 275, respectively. For example, the telematics unit 30 may associate any Wi-Fi hotspot data not provided to the MTD 96 as having a lower priority (or providing lesser QoS). In some instances, this determination may be transmitted from the telematics unit 30 to the call center 20, which then provides the vehicle services data according to the priority requested by the telematics unit. In other circumstances, the call center 20 may provide unprioritized vehicle services data to the telematics unit (or without regard to QoS) and the telematics unit 30 may determine which priority to provide the various communication devices (e.g., 96, 100, etc.).

Other embodiments are also possible. For example, the telematics unit 30 may be configured to store some of the billing parameters associated with various communication devices used in the vehicle. Periodically, this information may be uploaded to the call center 20 or server 18 (e.g., coincident to a billing cycle). Or for example, the telematics unit 30 may determine appropriate billing and/or QoS parameters according to the unique identifier associated with the communication device. Then, the telematics unit may request the vehicle services to be sent over specific data channels from the call center 20 or server 18. In addition, under certain circumstances, the telematics unit 30 may base the QoS parameters on additional situational criteria at the vehicle (e.g., emergency or other predetermined vehicle state).

The method(s) may be performed as one or more computer programs executable by one or more computing devices of or in communication with a vehicle telematics system to cause the system and/or the computing device(s) to perform the method, and the various method related data may be stored in any suitable memory. For example, the computer program(s) may be located at the telematics unit 30 or at the call center 20 or even at the cloud computer 18. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In one embodiment, the performed method(s) include computer programs executable using the mobile device processor and memory (including mobile device software stored thereon), the telematics unit processor and memory (including telematics unit software stored thereon), and/or the call center processor and memory (including backend software stored thereon).

In at least one embodiment, the computer program is configured to determine or select appropriate data channels for cellular transmission of the data services provided to the MTD 96 and mobile device 100. Thus, the computer program may reside at the call center 20—which call center also performs the cellular transmission. Or the computer program may reside at the telematics unit 30—which telematics unit then instructs the call center 20 to send the data services over the data channels which it determined. These are merely examples; other implementations are possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

The invention claimed is:

1. A method of providing vehicle data services to devices located at a vehicle via a vehicle telematics unit, comprising the steps of:
   (a) receiving a first request at the vehicle telematics unit for first vehicle data services from a vehicle head unit within the vehicle, wherein the first request includes a first identifier identifying the vehicle head unit as a sender of the first request;
   (b) receiving a second request at the telematics unit for second vehicle data services from a mobile device located at the vehicle, wherein the second request includes a second identifier identifying the mobile device as a sender of the second request, wherein the requested first and second vehicle data services comprise requests for infotainment data, entertainment data, or both;
   (c) transmitting from the telematics unit to at least one remote server the first request, the first identifier, the second request, and the second identifier, wherein, the transmitting step includes the first and second identifiers with the respective first and second requests so that any provided first vehicle data services are billable by a first entity and so that any provided second vehicle data services are billable by a second entity that is different than the first entity;
   (d) in response to step (c), receiving at the telematics unit the first and second vehicle data services from the at least one remote server; and
   (e) providing from the telematics unit the first vehicle data services to the vehicle head unit and the second vehicle data services to the mobile device,
   wherein the first vehicle data services provided to the vehicle head unit have at least one higher quality of service (QoS) parameter than the second vehicle data services provided to the mobile device.

2. The method of claim 1, wherein the first identifier is a MAC Address associated with the vehicle head unit and the second identifier is a MAC Address associated with the mobile device.

3. The method of claim 1, wherein step (d) further comprises receiving the first and second vehicle data services from a remote call center.

4. The method of claim 3, wherein the first vehicle data services are provided to the telematics unit over a first data channel, and the second vehicle data services are provided over a second data channel.

5. The method of claim 1, wherein the first vehicle data services have a higher priority than the second vehicle data services such that when communication bandwidth between the vehicle telematics unit and the at least one remote server is insufficient for a requested data throughput or when communication bandwidth between the telematics unit and the respective device is insufficient for the requested data throughput, the first vehicle data services are transmitted in their entirety before the second vehicle data services are transmitted in their entirety.

6. The method of claim 1, wherein the first vehicle data services are received by the telematics unit using a first packet data network (PDN), wherein the second vehicle data services are received by the telematics unit using second packet data network (PDN) that is different than the first PDN, so that data provided to the telematics unit based on the first request may be billed by the first entity and so that data provided to the telematics unit based on the second request may be billed by the second entity.

7. The method of claim 1, wherein the at least one remote server is located at a vehicle call center.

8. A method of providing vehicle data services to devices located at a vehicle via a vehicle telematics unit, comprising the steps of:
   (a) receiving a first request at the vehicle telematics unit for first vehicle data services from a vehicle head unit within the vehicle, wherein the first request includes a first identifier identifying the vehicle head unit as a sender of the first request;
   (b) receiving a second request at the telematics unit for second vehicle data services from a mobile device located at the vehicle, wherein the second request includes a second identifier identifying the mobile device as a sender of the second request; and
   (c) based on the received first and second identifiers, providing from the telematics unit the first vehicle data services to the vehicle head unit and providing from the telematics unit the second vehicle data services to the mobile device, wherein one or more quality of service (QoS) parameters associated with the first vehicle data services are superior to one or more quality of service (QoS) parameters associated with the second vehicle data services.

9. The method of claim 8, wherein the first and second vehicle data services are provided by the telematics unit according to a short range wireless communication (SRWC) protocol.

10. The method of claim 8, wherein, when during step (c) a data throughput is based on a bandwidth available to the telematics unit, providing an entirety of the first vehicle data services to the vehicle head unit before providing an entirety of the second vehicle data services to the mobile device.

11. The method of claim 8, further comprising:
   prior to step (c), wirelessly receiving the first and second vehicle data services at the telematics unit from at least one remote server, wherein first vehicle data services are received by the telematics unit over a first packet data network (PDN), and second vehicle data services are received by the telematics unit over a second packet data network (PDN).

12. The method of claim 11, wherein the at least one remote server associates the first PDN with first billing-related parameters and the at least one remote server associates the second PDN with second billing-related parameters.

13. The method of claim 11, wherein the at least one remote server is located at a vehicle call center.

14. The method of claim 8, wherein the telematics unit, based on the first and second identifiers, selectively predetermines and requests of the at least one remote server that the first and second vehicle data services be transmitted over two different predetermined cellular data channels.

15. A computer program product, comprising:
   a non-transitory computer readable medium for a call center computer unit for selectively providing vehicle data services to a vehicle head unit and a mobile device via a telematics unit in a vehicle, said computer configured to perform the following steps:
   (a) receiving from the telematics unit a first identifier associated with the vehicle head unit and a second identifier associated with the mobile device;

(b) via the telematics unit, receiving a first request for vehicle data services from the vehicle head unit and a second request for vehicle data services from the mobile device;

(c) based on the first and second identifiers and the first and second requests, transmitting to the telematics unit vehicle data services for the vehicle head unit and transmitting to the telematics unit vehicle data services for the mobile device, wherein one or more quality of service (QoS) parameters associated with the vehicle data services transmitted for the vehicle head unit are superior to one or more quality of service (QoS) parameters associated with the vehicle data services transmitted for the mobile device; and (d) storing billing parameters associated with the vehicle data services transmitted to the telematics unit for the vehicle head unit and the mobile device.

16. The computer program product of claim 15, wherein step (c) further comprises transmitting the vehicle data services for the vehicle head unit via a first packet data network (PDN) and transmitting the vehicle data services for the mobile device via a second PDN that is different than the first PDN.

\* \* \* \* \*